United States Patent
Yoshida et al.

(10) Patent No.: US 8,419,151 B2
(45) Date of Patent: Apr. 16, 2013

(54) INKJET PRINTER

(75) Inventors: Yasunari Yoshida, Aichi-ken (JP); Masashi Kuno, Obu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 731 days.

(21) Appl. No.: 12/557,327

(22) Filed: Sep. 10, 2009

(65) Prior Publication Data

US 2010/0066777 A1 Mar. 18, 2010

(30) Foreign Application Priority Data

Sep. 12, 2008 (JP) ................................ 2008-235389

(51) Int. Cl.
*B41J 2/205* (2006.01)
*G06K 15/00* (2006.01)

(52) U.S. Cl.
USPC .......................................... 347/15; 358/3.06

(58) Field of Classification Search .................... 347/15; 358/3.06

See application file for complete search history.

(56) References Cited

U.S. PATENT DOCUMENTS

| | | | |
|---|---|---|---|
| 5,926,582 | A | 7/1999 | Kakutani |
| 6,108,450 | A | 8/2000 | Ueda |
| 6,386,674 | B1 * | 5/2002 | Corrigan et al. ................. 347/19 |
| 7,420,700 | B2 | 9/2008 | Hayashi |
| 2002/0067510 | A1 * | 6/2002 | Kempf ......................... 358/3.03 |
| 2009/0219318 | A1 | 9/2009 | Maehira |

FOREIGN PATENT DOCUMENTS

| | | |
|---|---|---|
| JP | H08-274992 A | 10/1996 |
| JP | H10-150565 A | 6/1998 |
| JP | 2000-218777 A | 8/2000 |
| JP | 2000-238248 A | 9/2000 |
| JP | 2002-320089 A | 10/2002 |
| JP | 2003-153001 A | 5/2003 |
| JP | 2004-287685 A | 10/2004 |
| JP | 2005-184085 A | 7/2005 |

OTHER PUBLICATIONS

Cochran, Eugene, Blue Noise Mask: Premier Stochastic Image Technology, Jun. 2000, Research Corporation Technologies (www.rctech.com).*

Mitsa et al., Digital halftoning technique using a blue-noise mask, Nov. 1992, Optical Society of America, vol. 9, No. 11, pp. 1920-1929.*

Japan Patent Office, Office Action for Application No. JP2008-235389, mailed Aug. 3, 2010. (Counterpart to above-captioned patent application.).

* cited by examiner

*Primary Examiner* — Ryan Lepisto
*Assistant Examiner* — Erin Chiem
(74) *Attorney, Agent, or Firm* — Baker Botts L.L.P.

(57) ABSTRACT

A recording head having a plurality of recording elements arranged at a prescribed pitch in a first direction. A scanning unit is configured to move the recording head back and forth in a second direction perpendicular to the first direction. A setting unit is configured to set process pixels in an input image by rendering at least one of the plurality of recording elements disabled so as not to form dots and at least another one of the plurality of recording elements enabled to allow dots to be formed in each of a plurality of columns of a recording medium. A dot data generating unit is configured to generate dot data by applying a weight matrix to the density data of the process pixel. The dot data is applied to the recording head to form dots on the recording medium.

8 Claims, 9 Drawing Sheets

FIG.3

| f1 VALUE | PROCESS PIXEL SETTING DATA |
|---|---|
| 0 | A(ODD-NUMBERED COLUMNS) |
| 1 | B(EVEN-NUMBERED COLUMNS) |
| 2 | A |
| 3 | B |
| 4 | B |
| 5 | A |
| 6 | B |
| 7 | A |

FIG.4A

| f2 VALUE | WEIGHT MATRIX SETTING DATA |
|---|---|
| 0 | F1 |
| 1 | R1 |
| 2 | F2 |
| 3 | R2 |

| | y−4 | y−3 | y−2 | y−1 | y | y+1 | y+2 | y+3 | y+4 |
|---|---|---|---|---|---|---|---|---|---|
| x−2 | | 1 | | 1 | | 1 | | 0 | |
| x−1 | 1 | | 2 | | 4 | | 3 | | 0 |
| x | 1 | | 2 | | * | | | | |

| | y−4 | y−3 | y−2 | y−1 | y | y+1 | y+2 | y+3 | y+4 |
|---|---|---|---|---|---|---|---|---|---|
| x−2 | | 0 | | 1 | | 1 | | 1 | |
| x−1 | | 1 | | 4 | | 4 | | 1 | |
| x | | | | | * | | 2 | | 1 |

|  | y-4 | y-3 | y-2 | y-1 | y | y+1 | y+2 | y+3 | y+4 |
|---|---|---|---|---|---|---|---|---|---|
| x-2 | 0 |  | 1 |  | 1 |  | 1 |  | 0 |
| x-1 |  | 1 |  | 4 |  | 4 |  | 1 |  |
| x | 1 |  | 2 |  | * |  |  |  |  |

|  | y-4 | y-3 | y-2 | y-1 | y | y+1 | y+2 | y+3 | y+4 |
|---|---|---|---|---|---|---|---|---|---|
| x-2 | 0 |  | 1 |  | 1 |  | 1 |  | 0 |
| x-1 |  | 1 |  | 4 |  | 4 |  | 1 |  |
| x |  |  |  |  | * |  | 2 |  | 1 |

| PROCESS PIXEL SETTING DATA | MATRIX SETTING DATA |
|---|---|
| A | F1 |
| B | R1 |
| A | F2 |
| B | R2 |
| B | F1 |
| A | R1 |
| B | F2 |
| A | R2 |
| A | F1 |
| B | R1 |
| A | F2 |
| B | R2 |
| B | F1 |
| A | R1 |
| B | F2 |
| A | R2 |

| f1 VALUE | PROCESS PIXEL SETTING DATA |
|---|---|
| 0 | A(ODD-NUMBERED COLUMNS) |
| 1 | B(EVEN-NUMBERED COLUMNS) |
| 2 | A |
| 3 | B |
| 4 | A |
| 5 | B |
| 6 | A |
| 7 | B |
| 8 | B |
| 9 | A |
| 10 | B |
| 11 | A |
| 12 | B |
| 13 | A |
| 14 | B |
| 15 | A |

FIG.8B

| f2 VALUE | WEIGHT MATRIX SETTING DATA |
|---|---|
| 0 | F1 |
| 1 | R1 |
| 2 | F2 |
| 3 | R2 |
| 4 | F2 |
| 5 | R2 |
| 6 | F2 |
| 7 | R2 |

FIG.9

| ROW \ COLUMN | 1 | 2 | 3 | 4 | 5 | 6 | 7 | 8 | 9 | 10 | 11 | 12 | 13 | 14 | 15 | 16 | | PROCESS PIXEL SETTING DATA | MATRIX SETTING DATA |
|---|---|---|---|---|---|---|---|---|---|---|---|---|---|---|---|---|---|---|---|
| 1 | | | | | | | | | | | | | | | | | ⎫ P1 | A | F1 |
| 2 | | | | | | | | | | | | | | | | | | B | R1 |
| 3 | | | | | | | | | | | | | | | | | | A | F2 |
| 4 | | | | | | | | | | | | | | | | | | B | R2 |
| 5 | | | | | | | | | | | | | | | | | P2 | A | F2 |
| 6 | | | | | | | | | | | | | | | | | | B | R2 |
| 7 | | | | | | | | | | | | | | | | | | A | F2 |
| 8 | | | | | | | | | | | | | | | | | | B | R2 |
| 9 | | | | | | | | | | | | | | | | | P3 | B | F1 |
| 10 | | | | | | | | | | | | | | | | | | A | R1 |
| 11 | | | | | | | | | | | | | | | | | | B | F2 |
| 12 | | | | | | | | | | | | | | | | | | A | R2 |
| 13 | | | | | | | | | | | | | | | | | P4 | B | F2 |
| 14 | | | | | | | | | | | | | | | | | | A | R2 |
| 15 | | | | | | | | | | | | | | | | | | B | F2 |
| 16 | | | | | | | | | | | | | | | | | | A | R2 |

109

INKJET PRINTER

CROSS REFERENCE TO RELATED APPLICATION

This application claims priority from Japanese Patent Application No. 2008-235389 filed Sep. 12, 2008. The entire content of the priority application is incorporated herein by reference.

TECHNICAL FIELD

The present invention relates to an inkjet printer, a method for controlling the inkjet printer, and a computer-readable storage medium storing a set of program instructions executable on the inkjet printer.

BACKGROUND

Color inkjet printers and other printers employing an inkjet system are well known in the art as a type of recording device. A typical inkjet printer has a recording head in which is formed a plurality of ejection holes arrayed in a sub-scanning direction. A main scan is performed by ejecting ink sequentially from the ejection holes onto a recording medium while moving the recording head in a main scanning direction. Through this main scan, the printer forms a plurality of rasters on the recording medium, where one raster is one line configured of a plurality of dots aligned in the main scanning direction.

After performing this main scan, the inkjet printer next executes a sub scan according to a method such as conveying the recording medium in a direction intersecting (generally orthogonal to) the main scanning direction. After completing the sub scan, the printer again performs the main scan. An image is recorded (printed) on the recording medium by repeatedly and alternately performing the main scan and sub scan.

The recording head in this inkjet printer has a piezoelectric actuator for each ejection hole. During a recording operation, drive voltages are applied to the piezoelectric actuators, deforming the piezoelectric actuators and causing a prescribed amount of ink to be ejected from the corresponding ejection holes.

With increasing demand in recent years to improve the resolution of images printed on printing materials and to increase the printing speed, efforts have been made to increase the density of the ejection holes formed in the recording head and to shorten the time interval between ink ejections.

However, if ink droplets are ejected at shorter intervals from densely arranged ejection holes, the load on each ejection hole becomes severe when the ink droplets must be ejected from all ejection holes in a single main scan. In such a case, the system may not be able to respond completely by the next main scan, making ink ejection in the next scan unstable. Specifically, ink ejection in the next main scan may be irregular due to a less than normal amount of ink being ejected or the shape of the ejected ink droplets being distorted, for example, resulting in nonuniform or improperly formed dots and, consequently, a deterioration in image quality in the printed results.

A conventional inkjet recording apparatus has a thinning multi-pass printing mode. When printing in this mode, image data to be printed in each scan is pseudo-randomized with respect to the number of scans so as to shuffle the order in which the image data is printed. In this way, the printing apparatus reduces image noise while improving image quality.

SUMMARY

However, the results of pseudo-randomization naturally include cases in which ink droplets are ejected from all ejection holes in a single main scan. Consequently, the conventional inkjet recording apparatus does not sufficiently resolve the ejection irregularities described above.

In view of the foregoing, it is an object of the present invention to provide an inkjet printer, a method for controlling the inkjet printer, and a computer-readable storage medium storing a set of program instructions executable on the inkjet printer that can achieve stable ejection of ink droplets in each main scan and can record high-quality images on recording paper at a high rate of speed, even when ejecting droplets at short intervals (with a short ejection cycle).

In order to attain the above and other objects, the present invention provides an inkjet printer including a recording head, a conveying unit, a scanning unit, a setting unit, and a dot data generating unit. The recording head has a plurality of recording elements arranged at a prescribed pitch in a first direction. The recording head is movable in a second direction perpendicular to the first direction. The conveying unit is configured to convey the recording medium in the first direction past the recording head. The conveying unit is capable of conveying the recording medium a distance shorter than the prescribed pitch between two adjacent recording elements of the recording head to form dots on the recording medium. The scanning unit is configured to move the recording head back and forth in the second direction. The setting unit is configured to set process pixels in an input image by rendering at least one of the plurality of recording elements disabled so as not to form dots and at least another one of the plurality of recording elements enabled to allow dots to be formed in each of a plurality of columns of the recording medium, the process pixel having density data representing a gradation level of the process pixel. Row positions of the process pixels are determined depending upon the prescribed pitch between two adjacent recording elements of the recording head. A dot data generating unit is configured to generate dot data by applying a weight matrix to the density data of the process pixel. Weights set in the weight matrix are allocated based on an arrangement of the process pixels. The dot data is applied to the recording head to form dots on the recording medium.

Another aspect of the present invention provides a method for controlling an inkjet printer including a recording head, a conveying unit, a scanning unit. The recording head has a plurality of recording elements arranged at a prescribed pitch in a first direction. The recording head is movable in a second direction perpendicular to the first direction. The conveying unit is configured to convey the recording medium in the first direction past the recording head. The conveying unit is capable of conveying the recording medium a distance shorter than the prescribed pitch between two adjacent recording elements of the recording head to form dots on the recording medium. The scanning unit is configured to move the recording head back and forth in the second direction. The method includes:

setting process pixels in an input image by rendering at least one of the plurality of recording elements disabled so as not to form dots and at least another one of the plurality of recording elements enabled to allow dots to be formed in each of a plurality of columns of the recording medium, the process pixel having density data representing a gradation level of the process pixel, row positions of the process pixels being determined depending upon the prescribed pitch between two adjacent recording elements of the recording head; and generating dot data by applying a weight matrix to the density data of the process pixel, weights set in the weight matrix being allocated based on an arrangement of the process pixels, the dot data being applied to the recording head to form dots on the recording medium.

Another aspect of the present invention provides a computer-readable storage medium storing a set of program instructions executable on an inkjet printer including a recording head, a conveying unit, a scanning unit. The recording head has a plurality of recording elements arranged at a prescribed pitch in a first direction. The recording head is movable in a second direction perpendicular to the first direction. The conveying unit is configured to convey the recording medium in the first direction past the recording head. The conveying unit is capable of conveying the recording medium a distance shorter than the prescribed pitch between two adjacent recording elements of the recording head to form dots on the recording medium. The scanning unit is configured to move the recording head back and forth in the second direction. The set of program instructions includes:

setting process pixels in an input image by rendering at least one of the plurality of recording elements disabled so as not to form dots and at least another one of the plurality of recording elements enabled to allow dots to be formed in each of a plurality of columns of the recording medium, the process pixel having density data representing a gradation level of the process pixel, row positions of the process pixels being determined depending upon the prescribed pitch between two adjacent recording elements of the recording head; and generating dot data by applying a weight matrix to the density data of the process pixel, weights set in the weight matrix being allocated based on an arrangement of the process pixels, the dot data being applied to the recording head to form dots on the recording medium.

BRIEF DESCRIPTION OF THE DRAWINGS

The particular features and advantages of the invention as well as other objects will become apparent from the following description taken in connection with the accompanying drawings, in which:

FIG. 3 is a table conceptually illustrating a relationship between f1 values and process pixel setting data according to the first embodiment;

FIG. 4A is a table conceptually illustrating a relationship between f2 values and weighted matrix setting data according to the first embodiment;

FIG. 4B conceptually illustrates the content of a weighted matrix corresponding to matrix setting data F1 according to the first embodiment;

FIG. 4C conceptually illustrates the content of a weighted matrix corresponding to matrix setting data R1 according to the first embodiment;

FIG. 4D conceptually illustrates the content of a weighted matrix corresponding to matrix setting data F2 according to the first embodiment;

FIG. 4E conceptually illustrates the content of a weighted matrix corresponding to matrix setting data R2 according to the first embodiment;

FIG. 5A conceptually illustrates pixels in a pixel region for which dots can be formed as a result of performing the image process shown in FIG. 2 on a 16×16 pixel region according to the first embodiment;

FIG. 8A is a table conceptually illustrating a relationship between f1 values and process pixel setting data according to the second embodiment;

FIG. 8B is a table conceptually illustrating a relationship between f2 values and weighted matrix setting data according to the second embodiment; and FIG. 9 conceptually illustrates the pixels in a 16×16 pixel region for which dots can be formed as a result of setting process pixels and setting a weighted matrix for the error diffusion process according to the second embodiment.

DETAILED DESCRIPTION

Figure 1:
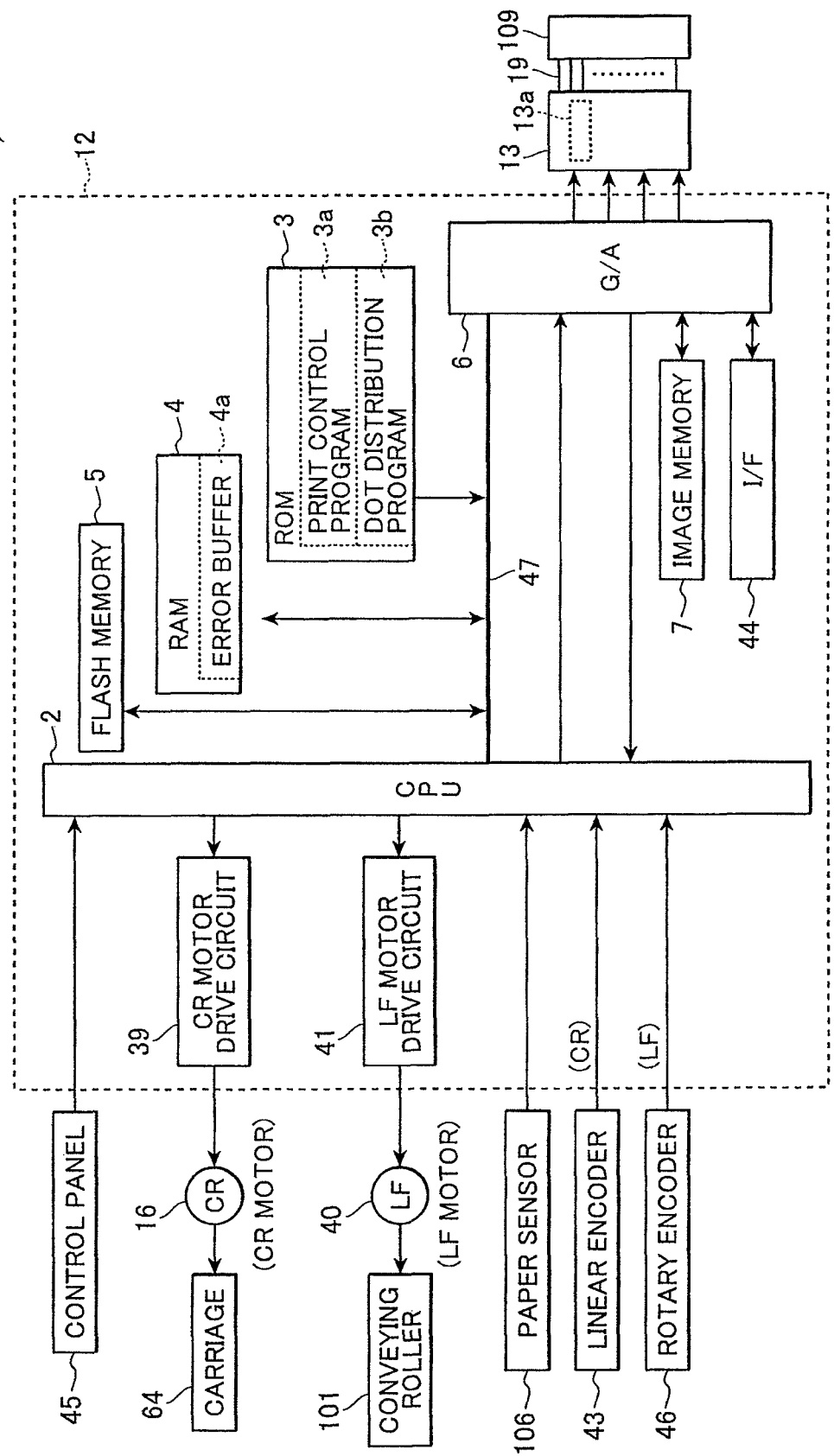
FIG. 1 is a block diagram showing a basic electrical circuit structure in a printer according to a first embodiment of the present invention.

Next, a printer 1 serving as a first embodiment of a recording device according to the present invention will be described while referring to the accompanying drawings. As shown in FIG. 1, the printer 1 is an inkjet-type apparatus that forms color images by ejecting ink in a plurality of colors onto a recording medium.

The recording controller for controlling the printer 1 in the preferred embodiment is configured of a control circuit board 12 disposed in the body of the printer 1, and a carriage circuit board 13. As will be described later in greater detail, the control circuit board 12 that is an example of an image processor performs control to avoid driving all ejection holes in a print head 109 within a single array aligned in a sub-scanning direction when recording dots in each column of a main scan. Through this control, the printer 1 according to the first embodiment can record high-quality images on recording paper at a high rate of speed.

Mounted on the control circuit board 12 are a CPU 2, a ROM 3 for storing fixed values and various control programs executed by the CPU 2, a RAM 4 for temporarily storing various data, a flash memory 5, an image memory 7, a gate array 6, and the like.

The CPU 2 processes inputted image data according to control programs stored in the ROM 3 and stores the results of the process in the image memory 7, generates print timing signals and the like, and transfers these signals to the gate array 6 described later. The CPU 2 is connected to a control panel 45 by which the user can input a print instruction and the like, a carriage motor (CR motor) drive circuit 39 for driving a CR motor 16, a line feed motor (LF motor) drive circuit 41 for driving an LF motor 40, a paper sensor 106, a linear encoder 43, and a rotary encoder 46. The CPU 2 controls each device connected thereto. The CR motor 16 functions to reciprocate a carriage 64 in a main scanning direction orthogonal to the sub-scanning direction. The print head 109 mentioned earlier is mounted in the carriage 64. The LF motor 40 functions to a conveying roller 101 for conveying recording paper in the sub-scanning direction.

The paper sensor 106 detects the presence of recording paper. The linear encoder 43 detects the amount of movement of the carriage 64. The CPU 2 controls reciprocating movement of the carriage 64 in the main scanning direction based on the amount of movement detected by the linear encoder 43. The rotary encoder 46 detects the amount of angular movement of the conveying rollers 101. The CPU 2 controls the conveying rollers 101 based on the amount of angular movement detected by the rotary encoder 46.

Data stored in the ROM 3 includes a print control program 3a for implementing a printing process, and an error diffusion program 3b for implementing an image process described later for input image data.

The error diffusion program 3b is an image processing program for avoiding, as a result of executing an error diffusion process on the input image data, cases in which a load is applied to all ejection holes of a column arranged in the sub-scanning direction of the print head 109 when forming dots (ejecting ink) in each column. The RAM 4 includes an error buffer 4a for each pixel. The error buffer 4a for each pixel accumulates and stores binarization errors gathered from peripheral pixels corresponding to each pixel. The flash memory 5 stores correction values and the like found in factory tests prior to shipping the product designed to correctly convey the recording paper and correctly scan the print head 109. The CPU 2, ROM 3, RAM 4, flash memory 5, and gate array 6 are interconnected via a bus line 47.

The gate array 6 transfers recording data (drive signals) for recording the image data on recording paper and a transfer clock signal for synchronizing with the recording data, and the like, to the carriage circuit board 13, based on a timing signal transferred from the CPU 2 and image data stored in the image memory 7. The gate array 6 also stores image data transferred from a personal computer, digital camera, and the like via a USB or other interface 44 in the image memory 7.

The carriage circuit board 13 applies drive voltages to piezoelectric actuators corresponding to the ejection holes formed in the print head 109. The carriage circuit board 13 has a head driver (drive circuit) 13a for supplying the drive voltages to the piezoelectric actuators.

The CPU 2 controls the head driver 13a through the gate array 6 mounted on the control circuit board 12 to apply drive voltages as needed to each piezoelectric actuator corresponding to each of the plurality of ejection holes. When a drive voltage is applied to a piezoelectric actuator, a prescribed amount of ink is ejected from the corresponding ejection hole formed in the print head 109. The head driver 13a and each of the piezoelectric actuators are connected to a flexible circuit board 19. The flexible circuit board 19 has a copper foil wiring pattern formed on polyimide film having a thickness of 50-150 μm.

The ejection holes are formed in the bottom surface of the print head 109, which is the surface opposing the recording paper in a printing operation. An array of ejection holes extending in the conveying direction of the recording paper (the sub-scanning direction) is provided for each color of ink. Ink colors may include cyan, magenta, yellow, blue, and black, for example. The ejection holes in each array are arranged at a prescribed pitch, such as 150 dpi. Here, the array of ejection holes corresponding to each color of ink may be linear or in a staggered arrangement (i.e. the ejection holes are arranged on a plurality of lines, respectively, to form the array of ejection holes.). Further, one or a plurality of arrays of ejection holes may be provided for each color of ink based on the need for each color.

The print head 109 mounted in the carriage 64 reciprocates in the main scanning direction orthogonal to the direction in which the recording paper is conveyed. Further, ink cartridges (not shown) accommodating ink in each of the printing colors are connected to the print head 109 via ink tubes (not shown) for supplying ink to each of the ejection holes formed in the print head 109.

Next, the image process executed by the CPU 2 based on the error diffusion program 3b stored in the ROM 3 will be described with reference to FIG. 2. This image process is performed to handle cases in which the printing resolution is four times the print head resolution, i.e., the pitch of ejection holes formed linearly in the print head 109 along the sub-scanning direction (for example, when the print head resolution is 150 dpi and the printing resolution is 600 dpi).

Figure 2:
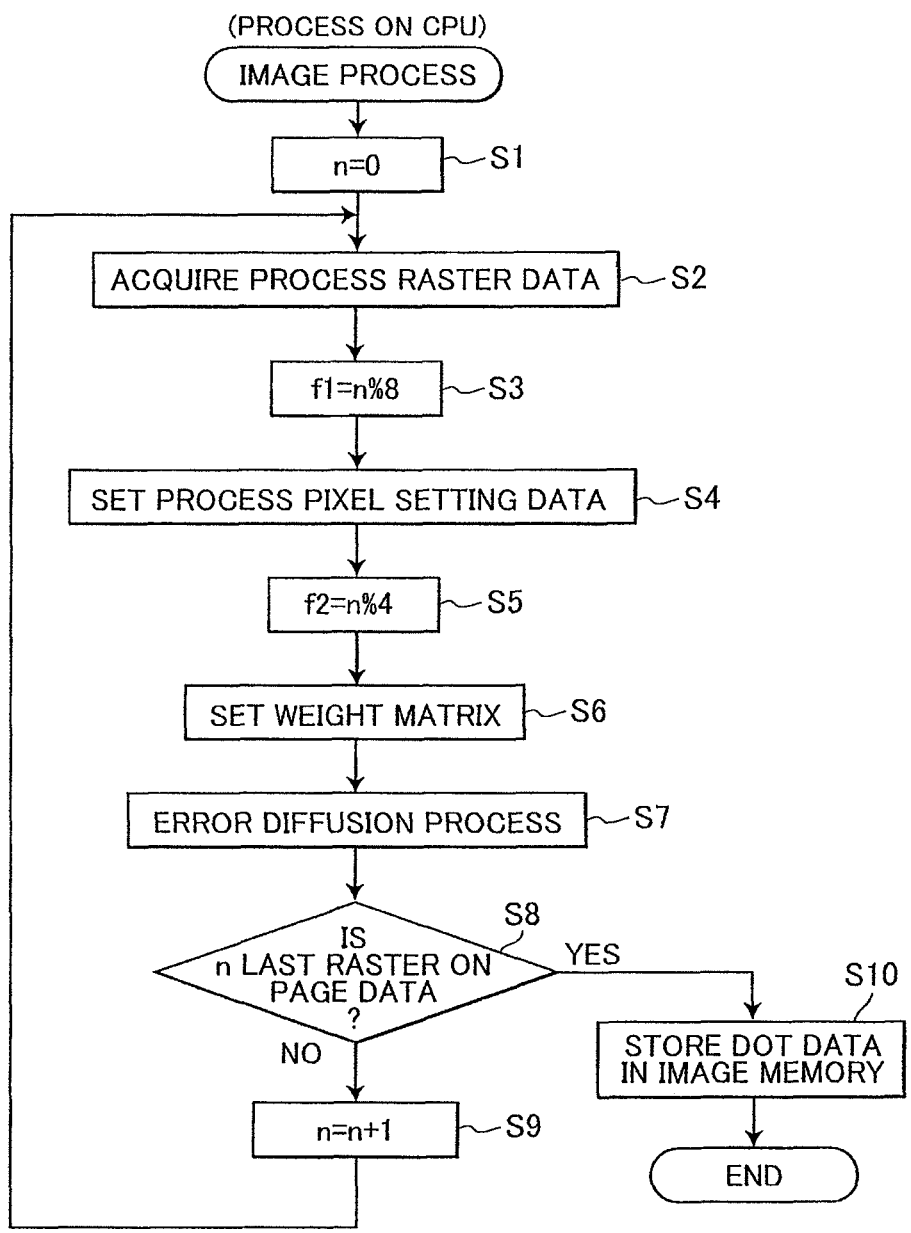
FIG. 2 is a flowchart illustrating steps in an image process according to the first embodiment.

The CPU 2 executes the image process shown in FIG. 2 when a command to print desired input image data is issued. In S1 of the image process, the CPU 2 initializes a variable n to 0, where the variable n specifies a raster number (row number) in the input image data. In S2 the CPU 2 acquires process raster data corresponding to the value of n (specifically, pixel density data representing a gradation level for the pixel in each column corresponding to the specified raster).

In S3 the CPU 2 calculates a remainder f1 produced when dividing n by 8. In S4 the CPU 2 sets process pixel setting data (see FIG. 3) corresponding to the calculated value of f1, thereby setting process pixels to be used in the error diffusion process for each raster corresponding to the value of n. Since the remainder f1 resulting from a division by 8 is a value between 0 and 7, the process pixels set for each raster in the preferred embodiment change sequentially in a pattern having a cycle of eight rasters.

In S5 the CPU 2 calculates the value of a remainder f2 obtained by dividing n by 4. In S6 the CPU 2 sets matrix setting data (see FIG. 4) corresponding to the calculated value of f2, thereby setting a weighted matrix to be applied to the error diffusion process on a single raster corresponding to the value of n. Since the remainder f2 obtained through division by 4 is a value from 0 to 3, the weighted matrix applied to each raster in the preferred embodiment changes sequentially in a pattern having a cycle of four rasters.

In S7 the CPU 2 executes the error diffusion process well known in the art to generate dot data by applying the weighted matrix set in S6 to each of the process pixels set in S4.

More specifically, the CPU 2 sets one of the process pixels determined in S4 as a target pixel, calculates a binarization error sum (weighted error sum) E based on binarization errors in the error buffers 4a for peripheral pixels corresponding to this target pixel, and calculates a correction density I' by adding the binarization error sum E to a pixel density I of the target pixel. The binarization error sum E is the sum of binarization errors of the peripheral pixels corresponding to the target pixel.

Next, the CPU 2 makes a setting based on the calculated correction density I' to indicate whether a dot is to be formed for the target pixel. Specifically, the CPU 2 sets a value D (dot data) for the output signal to a value indicating dot formation (255, for example) when the calculated correction density I' is greater than or equal to a prescribed threshold (128, for example), and sets the value D for the output signal to a value indicating no dot formation (0, for example) when the calculated correction density I' is less than the prescribed threshold, and stores this value D in a buffer (not shown) provided in the RAM 4.

Next, the CPU 2 calculates a binarization error e generated by the target pixel by subtracting the value D of the output signal from the correction density I' (e=I'−D), distributes the binarization error e calculated for the target pixel among the peripheral pixels using the weighted matrix selected in S6, and adds each value distributed among the peripheral pixels to the value stored in each error buffer 4a for the corresponding pixel.

Subsequently, the CPU 2 shifts the target pixel to the next pixel in a process direction among the process pixels set in S4 in order to perform the error diffusion process on all process pixels in the single raster corresponding to the value of n (all process pixels set in S4). The process direction in the preferred embodiment is the forward direction (the direction of increasing column numbers) for odd rasters and the reverse direction (the direction of decreasing column numbers) for even rasters.

After completing the process in S7, i.e., after the error diffusion process has been performed on all process pixels in the raster corresponding to the value of n, in S8 the CPU 2 determines whether the variable n indicates the last raster on the page. If the variable n does not indicate the last raster on the page (S8: NO), in S9 the CPU 2 increments the variable n by 1 and returns to S2 to perform the above process in S2-S7 on the next raster.

However, if the CPU 2 determines in S8 that the variable n indicates the last raster on the page (S8: YES), then the above process has been completed for all rasters in one page. Accordingly, in S10 the CPU 2 stores dot data for all rasters acquired in the error diffusion process of S7 in the image memory 7, and subsequently ends the image process. The image process of FIG. 2 described above is performed for one sheet of recording paper (one page). Accordingly, when printing on a plurality of sheets of recording paper, this process is executed a number of times equivalent to the number of pages to be printed.

Here, a description of the process pixels will be given with reference to FIG. 3. The process pixels are set in S4 of the image process described above with reference to FIG. 2. The content indicated in FIG. 3 is included in the error diffusion program 3b and may be stored in the ROM 3 as a table.

As shown in FIG. 3, the process pixel setting data is either A, indicating that process pixels are in odd-numbered columns, or B, indicating that process pixels are in even-numbered columns. The process pixel setting data A is associated with rasters indicating an f1 value of 0 (i.e., n=0, 8, ..., 8t, where t is an integer of 0 or greater), and the process pixel setting data B is associated with rasters indicating an f1 value of 1 (i.e., n=1, 9, ..., 8t+1, where t is an integer of 0 or greater).

The process pixel setting data A is also associated with rasters indicating an f1 value of 2 (i.e., n=2, 10, ..., 8t+2, where t is an integer of 0 or greater), and the process pixel setting data B is also associated with rasters indicating an f1 value of 3 (i.e., n=3, 11, ..., 8t+3, where t is an integer of 0 or greater).

Hence, in the process of S4 described above, the CPU 2 staggers the process pixels in the sub-scanning direction (from row-to-row) for the four rasters having the f1 values from 0 to 3.

As shown in FIG. 3, the process pixel setting data B is also associated with rasters indicating an f1 value of 4 (i.e., n=4, 12, ..., 8t+4, where t is an integer of 0 or greater), and the process pixel setting data A is also associated with rasters indicating an f1 value of 5 (i.e., n=5, 13, ..., 8t+5, where t is an integer of 0 or greater).

The process pixel setting data B is also associated with rasters indicating an f1 value of 6 (i.e., n=6, 14, ..., 8t+6, where t is an integer of 0 or greater), and the process pixel setting data A is also associated with rasters indicating an f1 value of 7 (i.e., n=7, 15, ..., 8t+7, where t is an integer of 0 or greater).

Hence, in the process of S4 described above, the CPU 2 staggers the process pixels in the sub-scanning direction (from row-to-row) for the four rasters indicating the f1 values from 4 to 7 in an arrangement inverted from that for the four rasters indicating f1 values from 0 to 3.

Stated another way, by setting process pixel setting data in S4 based on the f1 value and the table shown in FIG. 3, the order of rasters in which pixels in odd-numbered columns are set as the process pixels and rasters in which pixels in even-numbered columns are set as the process pixels is reversed every four rasters, which is equivalent to the print head resolution (i.e., the pitch of ejection holes aligned in the subscanning direction in the print head 109.

Next, the weighted matrix set in S6 of the image process described above (see FIG. 2) will be described with reference to FIG. 4. The content shown in FIG. 4A and/or FIGS. 4B-4E are included in the error diffusion program 3b and may be stored in the ROM 3 as tables.

As shown in FIG. 4A, a weighted matrix with three rows and nine columns (a 3×9 matrix) that corresponds to the matrix setting data F1 (see FIG. 4B) is applied to rasters indicating an f2 value of 0 (i.e., n=0, 4, 8, ..., 4s, where s is an integer of 0 or greater).

Here, since rasters indicating an f2 value of 0 are odd rasters, the process direction for error diffusion is the forward direction indicated by the arrow F. Further, the weights set in the matrix shown in FIG. 4B are allocated based on the arrangement of process pixels set in S4 and the process direction (forward direction in this case).

Hence, in the weighted matrix shown in FIG. 4B, weights assigned in row x that includes the target pixel (x, y) indicated by an "*" are distributed in a direction from the target pixel (x, y) opposite the process direction indicated by the arrow F. In the example shown in FIG. 4B, weights "2" and "1" are respectively assigned to the two pixels (x, y−2) and (x, y−4) corresponding to every other column in the direction opposite the process direction from the target pixel (x, y).

In row (x−1) neighboring the row that includes the target pixel (x, y), weights are assigned to pixels in every other column, including pixel (x−1, y) in the same column as the target pixel (x, y). In the example shown in FIG. 4B, the weights "1", "2", "4", "3", and "0" have been respectively assigned to pixel (x−1, y−4), pixel (x−1, y−2), pixel (x−1, y), pixel (x−1, y+2), and pixel (x−1, y+4).

In row (x−2) weights are assigned to pixels in different alternating columns than the assigned columns in row x including the target pixel (x, y) and row (x−1). In the example shown in FIG. 4B, weights "1", "1", "1", and "0" are respectively assigned to pixel (x−2, y−3), pixel (x−2, y−1), pixel (x−2, y+1), and pixel (x−2, y+3).

As shown in FIG. 4A, a 3×9 weighted matrix that corresponds to the matrix setting data R1 (see FIG. 4C) is applied to rasters indicating an f2 value of 1 (i.e., n=1, 5, 9, ..., 4s+1, where s is an integer of 0 or greater).

Here, since rasters indicating an f2 value of 1 are even rasters, the process direction for error diffusion is the reverse direction indicated by the arrow R. Further, the weights set in the matrix shown in FIG. 4C are distributed based on the arrangement of process pixels set in S4 and the process direction (reverse direction in this case).

Hence, in the weighted matrix shown in FIG. 4C, weights assigned in row x that includes the target pixel (x, y) indicated by an "*" are distributed in a direction from the target pixel (x, y) opposite the process direction indicated by the arrow R. In the example shown in FIG. 4C, weights "2" and "1" are respectively assigned to the two pixels (x, y+2) and (x, y+4)

corresponding to every other column in the direction opposite the process direction from the target pixel (x, y).

In row (x−1) neighboring the row that includes the target pixel (x, y), weights are assigned to pixels in alternating columns different from the columns used in row x that includes the target pixel (x, y). In the example shown in FIG. 4C, the weights "1", "4", "4", and "1" have been respectively assigned to pixel (x−1, y+3), pixel (x−1, y+1), pixel (x−1, y−1), and pixel (x−1, y−3).

In row (x−2) weights are assigned to pixels in different alternating columns than the assigned columns in row x including the target pixel (x, y). In the example shown in FIG. 4C, weights "1", "1", "1" and "0" are respectively assigned to pixel (x−2, y+3), pixel (x−2, y+1), pixel (x−2, y−1), and pixel (x−2, y−3).

As shown in FIG. 4A, a 3×9 weighted matrix that corresponds to the matrix setting data F2 (see FIG. 4D) is applied to rasters indicating an f2 value of 2 (i.e., n=2, 6, 10, . . . , 4s+2, where s is an integer of 0 or greater).

Here, since rasters indicating an f2 value of 2 are odd rasters, the process direction for error diffusion is the forward direction indicated by the arrow F. Further, the weights set in the matrix shown in FIG. 4D are distributed based on the arrangement of process pixels set in S4 and the process direction (forward direction in this case).

Hence, in the weighted matrix shown in FIG. 4D, weights assigned in row x that includes the target pixel (x, y) indicated by an "*" are distributed in a direction from the target pixel (x, y) opposite the process direction indicated by the arrow F. In the example shown in FIG. 4D, weights "2" and "1" are respectively assigned to the two pixels (x, y−2) and (x, y−4) corresponding to every other column in the direction opposite the process direction from the target pixel (x, y).

In row (x−1) neighboring the row that includes the target pixel (x, y), weights are assigned to pixels in different alternating columns than row x that includes the target pixel (x, y). In the example shown in FIG. 4D, the weights "1", "4", "4", and "1" have been respectively assigned to pixel (x−1, y−3), pixel (x−1, y−1), pixel (x−1, y+1), and pixel (x−1, y+3).

In row (x−2) weights are assigned to pixels in alternating columns that include pixel (x−2, y) in the same column as the target pixel (x, y). In the example shown in FIG. 4D, weights "0", "1", "1", "1", and "0" are respectively assigned to pixel (x−2, y−4), pixel (x−2, y−2), pixel (x−2, y), pixel (x−2, y+2), and pixel (x−2, y+4).

As shown in FIG. 4A, a 3×9 weighted matrix that corresponds to the matrix setting data R2 (see FIG. 4E) is applied to rasters indicating an f2 value of 3 (i.e., n=3, 7, 11, . . . , 4s+3, where s is an integer of 0 or greater).

Here, since rasters indicating an f2 value of 3 are even rasters, the process direction for error diffusion is the reverse direction indicated by the arrow R. Further, the weights set in the matrix shown in FIG. 4E are distributed based on the arrangement of process pixels set in S4 and the process direction (reverse direction in this case).

Hence, in the weighted matrix shown in FIG. 4E, weights assigned in row x that includes the target pixel (x, y) indicated by an "*" are distributed in a direction from the target pixel (x, y) opposite the process direction indicated by the arrow R. In the example shown in FIG. 4E, weights "2" and "1" are respectively assigned to the two pixels (x, y+2) and (x, y+4) corresponding to every other column in the direction opposite the process direction from the target pixel (x, y).

In row (x−1) neighboring the row that includes the target pixel (x, y), weights are assigned to pixels in alternating columns different from the columns used in row x that includes the target pixel (x, y). In the example shown in FIG. 4E, the weights "1", "4", "4", and "1" have been respectively assigned to pixel (x−1, y+3), pixel (x−1, y+1), pixel (x−1, y−1), and pixel (x−1, y−3).

In row (x−2) weights are assigned to pixels in alternating columns that include pixel (x−2, y) in the same column as the target pixel (x, y). In the example shown in FIG. 4E, weights "0", "1", "1", "1", and "0" are respectively assigned to pixel (x−2, y+4), pixel (x−2, y+2), pixel (x−2, y), pixel (x−2, y−2), and pixel (x−2, y−4).

Figure 5B:
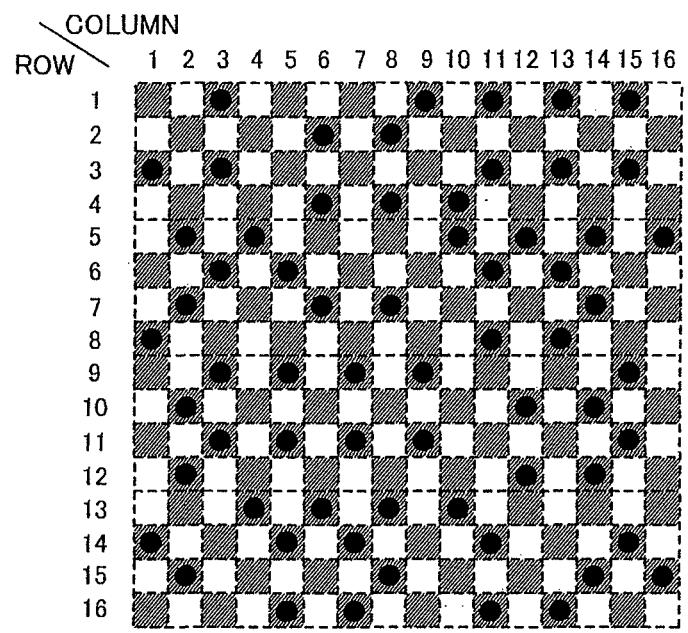
FIG. 5B shows an example of forming a dot pattern at about 50% density using the pixels shown in FIG. 5A for which dot formation is allowed.

By setting the process pixels based on the f1 value and subsequently applying the weighted matrix corresponding to the f2 value (i.e., a weighted matrix with weighted values distributed according to the layout of the process pixels) to the rasters, it is possible to control the dot formation positions in the dot data (output image data), as shown in FIGS. 5A and 5B.

FIG. 5A conceptually illustrates the pixels in a pixel region for which dots can be formed as a result of performing the image process of the preferred embodiment (see FIG. 2) on a 16×16 pixel region. FIG. 5B shows an example of forming a dot pattern at about 50% density using the pixels shown in FIG. 5A for which dot formation is allowed (in this case, 65 pixels, or about half of the 128 pixels in the 16×16 pixel region at which dots can be formed). In FIG. 5B the black circular dots represent the 65 pixels at which dots are to be formed.

Dot data is data indicating whether or not to form dots at positions on a grid configured of columns denoting equally spaced positions in the main scanning direction, and rows (rasters) denoting equally spaced positions in the sub-scanning direction. Sequential column numbers, in the form of column 1, column 2, . . . , are assigned to each column of dot data beginning from the left edge of the recording paper. Similarly, sequential raster numbers, in the form of row 1, row 2, . . . , are assigned to rows in the dot data beginning from the top of the recording paper. In FIGS. 5A and 5A, grid points at the intersections of rows and columns are represented by square boxes. The shaded boxes indicate pixels determined in the image process of the preferred embodiment (see FIG. 2) for which dot formation is possible.

As shown in FIG. 5A, the pixels for which dots can be formed are distributed by thinning out the total 256 pixels in the 16×16 grid to about half that number (i.e., 128 pixels). As described above in the image process of the preferred embodiment (see FIG. 2), the pixels are thinned by setting process pixels to every other column (odd columns or even columns) in each raster and applying a corresponding weighted matrix to this layout of process pixels.

The thinned arrangement of dot formable pixels shown in FIG. 5A is divided into units of four rasters. The dot formable pixels in each unit of four rasters are staggered (offset from each other in the sub-scanning direction) in neighboring rasters such that even-numbered columns are used in one raster and odd-numbered columns in a neighboring raster. Although the staggered formation is not perfect throughout the entire pixel region, such as between the $4^{th}$ and $5^{th}$ rasters, pixels throughout the overall region are substantially staggered with respect to the sub-scanning direction.

By staggering the dots in this way, white streaks (banding) that can occur when the recording paper is conveyed farther than the prescribed conveying amount do not form a straight line. Hence, the staggered configuration avoids noticeable banding, preventing a decline in the quality of images recorded on the paper.

Further, the image process of the preferred embodiment produces a pattern shown in FIG. 5A in which the dot formable pixels of adjacent rasters alternate between even-numbered columns and odd-numbered columns in cycles of four rasters, which is equivalent to the print head resolution (i.e., the pitch of ejection holes formed in a column of the print head 109 aligned in the sub-scanning direction). Hence, each ejection hole formed in a column on the print head 109 in the sub-scanning direction is alternately assigned as an ejection hole for forming dots in odd-numbered columns and an ejection hole for forming dots in even-numbered columns.

The print head 109 having ejection holes P1-P4 aligned along the sub-scanning direction is depicted next to the pixel region in FIG. 5A in order to facilitate understanding of the relationship between the ejection holes in the print head 109 and the positions at which these ejection holes can form dots. As described earlier, the print head 109 has a plurality (100, for example) of ejection holes aligned for each color of ink. In order to facilitate understanding of the present invention, the following description of the preferred embodiment will focus only on one column of ejection holes in the print head 109 and will assume that the column has only four ejection holes. Accordingly, the print head 109 shown in FIG. 5A is depicted with only one column of ejection holes P1-P4.

FIGS. 6A-6D conceptually illustrates the positions of dots to be formed (recorded) on recording paper by the ejection holes P1-P4 in each main scan (each pass) for the dot formable pixels in the pixel region (the shaded pixels in FIG. 5A) set in the image process of the preferred embodiment for a 16×16 pixel region. To facilitate understanding, the following description will assume that the dot pattern is formed at 100% density.

In FIGS. 6A-6D, boxes indicating positions at which dots are to be formed have been shaded. Further, numbers have been added to the shaded boxes (dot positions) to specify the pass in which the dots are formed.

Figure 6A:
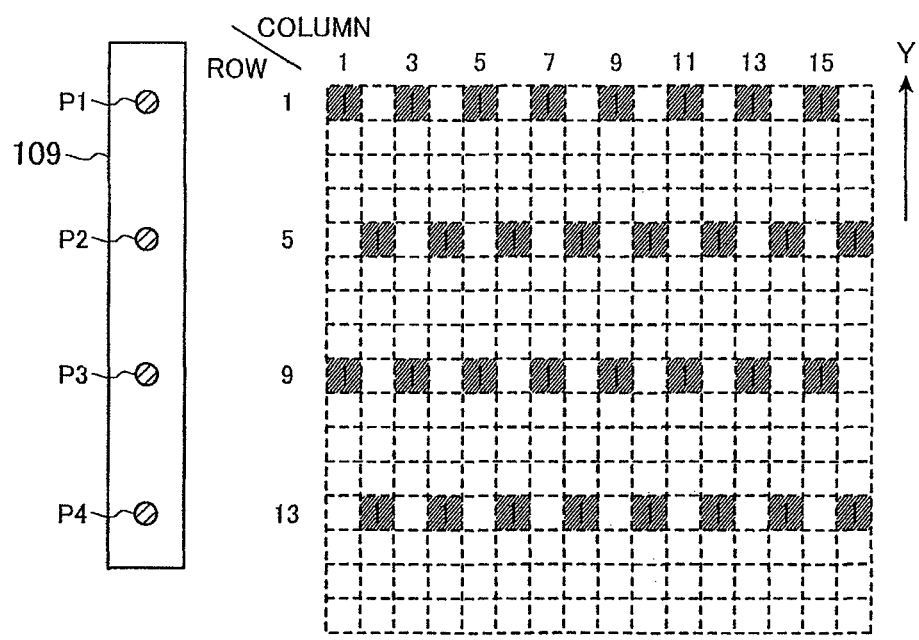
FIGS. 6A-6D conceptually illustrates the positions of dots to be formed on recording paper by the ejection holes in each main scan.
Figure 6B:
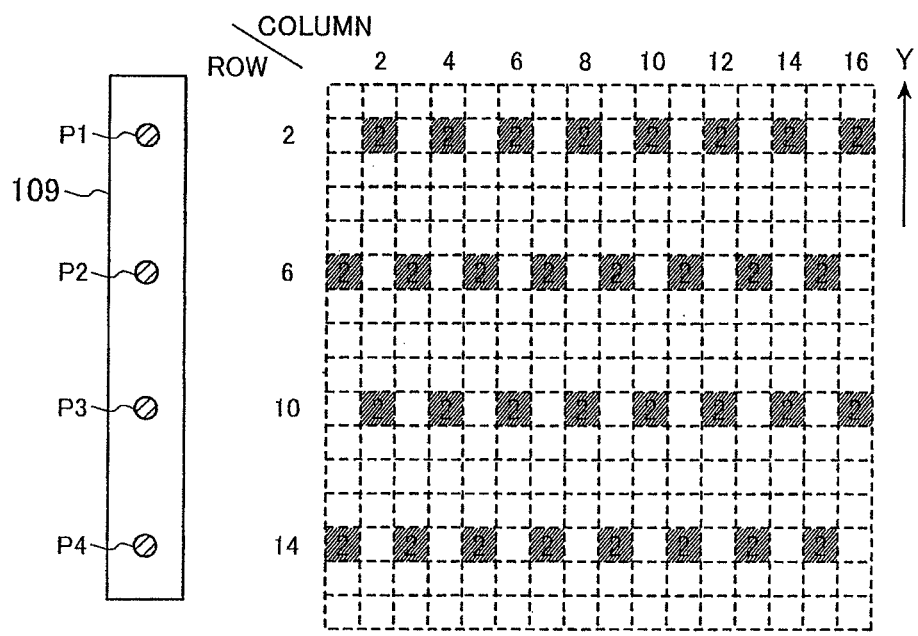
Figure 6C:
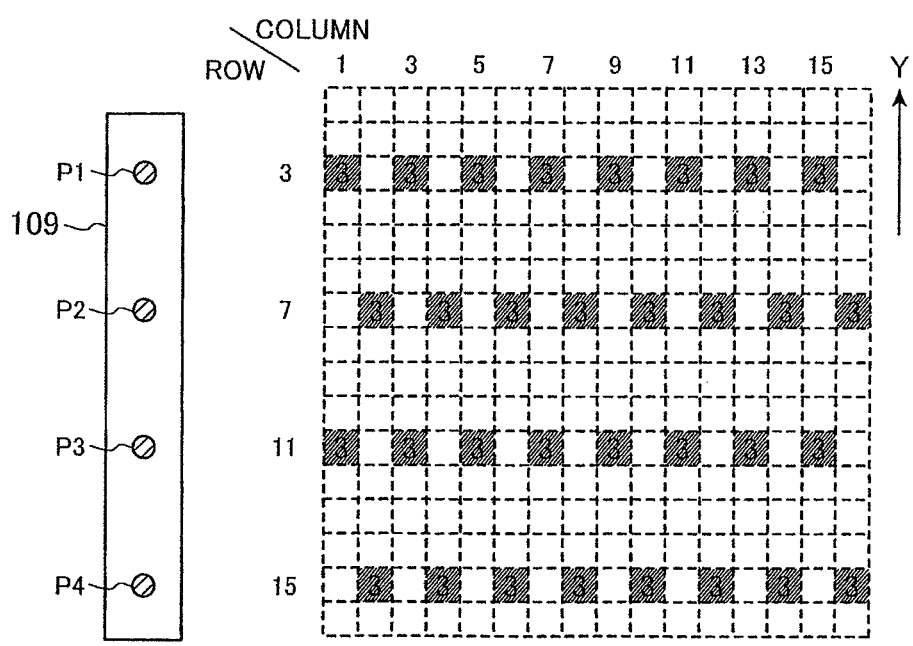
Figure 6D:
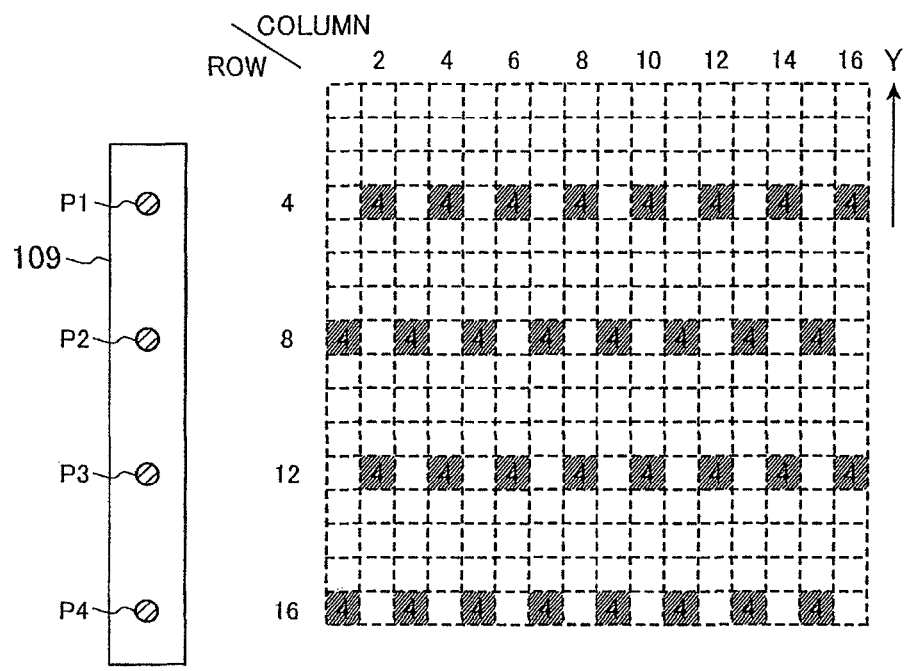

FIG. 6A shows the positions at which dots are to be formed in the first main scan (first pass). FIG. 6B shows the positions at which dots are to be formed in the second main scan (second pass). FIG. 6C shows the positions at which dots are to be formed in the third main scan (third pass). FIG. 6D shows the positions at which dots are to be formed in the fourth main scan (fourth pass).

As shown in FIG. 6A, the first and third ejection holes P1 and P3 form dots in every odd column of the $0^{th}$ and $8^{th}$ rasters during the first main scan. In the same first main scan, second and fourth ejection holes P2 and P4 form dots in every even column of the $4^{th}$ and $12^{th}$ rasters.

In a second main scan shown in FIG. 6B performed after conveying the recording paper in the sub-scanning direction Y (see FIG. 6A) following the first main scan, the first and third ejection holes P1 and P3 form dots in every even column of the $1^{st}$ and $9^{th}$ rasters. In the same second pass, the second and fourth ejection holes P2 and P4 form dots in every odd column of the $5^{th}$ and $13^{th}$ rasters.

In the third main scan shown in FIG. 6C performed after conveying the recording paper in the sub-scanning direction Y following the second main scan, the first and third ejection holes P1 and P3 form dots in every odd column of the $2^{nd}$ and $10^{th}$ rasters. In the same third pass, the second and fourth ejection holes P2 and P4 form dots in every even column of the $6^{th}$ and $14^{th}$ rasters.

In the fourth main scan shown in FIG. 6D performed after conveying the recording paper in the sub-scanning direction Y following the third main scan, the first and third ejection holes P1 and P3 form dots in every even column of the $3^{rd}$ and $11^{th}$ rasters. In the same fourth pass, the second and fourth ejection holes P2 and P4 form dots in every odd column of the $7^{th}$ and $15^{th}$ rasters.

Hence, dots in each column are formed using only half (50%) of the ejection holes provided in the print head 109 along the sub-scanning direction in any one pass (hereinafter referred to as the "current pass" when referring to a specific point in time), even when forming a dot pattern at 100% density using the pixels shown in FIG. 5A for which dot formation is allowed. Therefore, the method of the preferred embodiment avoids cases in which all ejection holes on the print head 109 along the sub-scanning direction are driven to form dots in each column, even when forming the dot pattern at 100% density for the pixels shown in FIG. 5A.

A case in which the dot pattern is formed at 100% density was described above to facilitate understanding. However, when forming a dot pattern at 50% density, as shown in FIG. 5B, dots may simply be formed for the corresponding pixels (pixels indicated by black circular dots in FIG. 5B).

As described above, the printer 1 (the control circuit board 12) of the preferred embodiment can arrange at least one each of a pixel at which dots can be formed and a pixel at which dots cannot be formed in each column of input image data by first setting process pixels to be used in the error diffusion process on each raster in the input image data based on the resolution of the print head 109 (pitch of ejection holes aligned in the sub-scanning direction) and applying a weighted matrix with weighted values arranged according to the layout of the process pixels.

This allows the printer 1 to avoid cases in which a load is applied to all ejection holes on the print head 109 along the sub-scanning direction when forming dots in each column (during ink ejection). Accordingly, the state of the ejection holes for each main scan can be maintained with stability, even when the ejection holes are provided at a high density.

A particular feature of the invention is the ability to use half (50%) of the total number of ejection holes aligned in the sub-scanning direction that can be used in each main scan, thereby minimizing fluctuations in load on the ejection holes between main scans. Hence, the present invention suppresses the occurrence of distortion in the print head 109, hysteresis in the piezoelectric actuators, and other factors caused by excessive load on the ejection holes that can lead to instability in the condition of the ejection holes, even when shortening the drive interval for the ejection holes, i.e., the period between ink ejections from the same ejection hole (ejection cycle).

Consequently, the invention can maintain the ejection holes in a stable state for each main scan, even when shortening the drive interval of ejection holes provided at a high density. As a result, the invention can prevent an increase in the expected amount of ejected ink (3 picoliters, for example) and can prevent distortion in the shape of the dots formed on the recording paper.

By maintaining the ejection holes in a stable condition for each main scan in this way, the printer 1 (the control circuit board 12) of the preferred embodiment can prevent nonuniform or improper dot shapes, thereby preventing a drop in the quality of images recorded on recording paper and enabling high-quality images to be recorded at a high speed.

Further, the printer 1 according to the preferred embodiment uses every other ejection hole arranged in the sub-scanning direction for each main scan. Hence, it is possible not only to minimize fluctuations in load on the ejection holes for each main scan, as described above, but also to reduce the occurrence of adjacent ejection holes being driven simultaneously, thereby suppressing structural interference and more satisfactorily maintaining the ejection holes in a stable state for each main scan.

Further, by setting the layout of process pixels used to effect error diffusion in cyclic patterns, the printer 1 of the preferred embodiment can avoid applying a load to all ejection holes in a single array of the print head 109 aligned in the sub-scanning direction when forming dots in each column of a main scan by changing the process pixel setting data and matrix setting data in cycles.

In the first embodiment described above, the printer 1 is configured to set the process pixel setting data based on its relationship to the f1 value calculated by f1=n % 8. However, similar results can be obtained for f1={n+int(n/4)}% 2 by using the process pixel setting data A (for pixels in odd-numbered columns) when f1'=0 and using process pixel setting data B (for pixels in even-numbered columns) when f1'=1.

Next, a printer 101 according to the second embodiment will be described with reference to FIGS. 1, and 7 through 9. In the first embodiment described above, the printer 1 uses half (50%) of the total number of ejection holes that can be used in a single main scan simply by using every other ejection hole of a column arranged in the sub-scanning direction of the print head 109.

In the second embodiment, the printer 101 avoids cases in which a load is applied to all ejection holes P1-P4 of a column arranged in the sub-scanning direction of the print head 109 when forming dots in each column, while also giving consideration to the electrical paths for supplying drive voltages to the ejection holes (the drive voltage supply system). In the second embodiment, like parts and components to those in the first embodiment described above are designated with the same reference numerals to avoid duplicating description.

First, the electrical paths for supplying drive voltages to the ejection holes P1-P4 formed in the print head 109 will be described with reference to FIG. 7.

Figure 7:
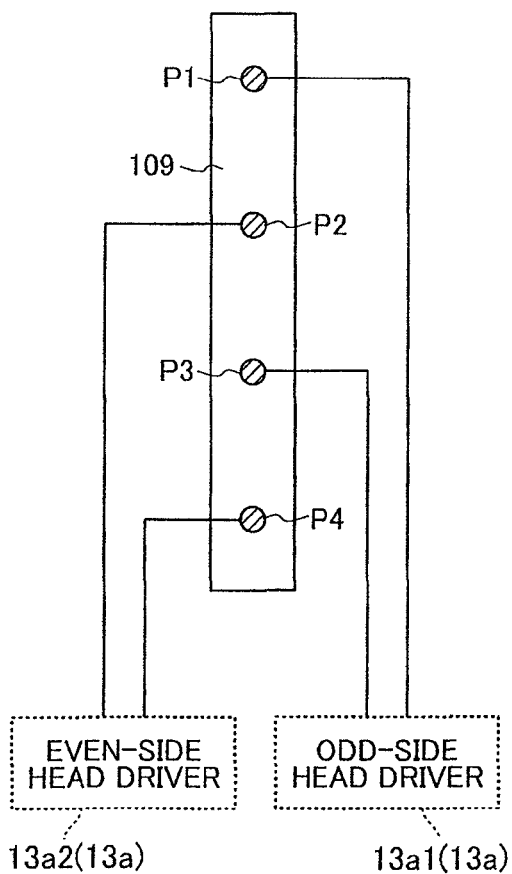
FIG. 7 is an explanatory diagram showing connection correlations between each of the ejection holes formed in the print head and the head driver according to a second embodiment of the present invention.

As shown in FIG. 7, each of the odd-numbered ejection holes P1 and P3 is connected to an odd-side head driver 13a1, while each of the even-numbered ejection holes P2 and P4 is connected to an even-side head driver 13a2.

In this way, electrical paths for supplying drive voltages to the odd-numbered ejection holes P1 and P3 are provided separately from electrical paths for supplying drive voltages to the even-numbered ejection holes P2 and P4. Providing two systems for supplying drive voltages to the ejection holes P1-P4 is advantageous for running the wiring. Further, by setting similar wiring conditions for all ejection holes P1-P4, the printer 101 can control all ejection holes P1-P4 to achieve the same characteristics.

The odd-side head driver 13a1 is part of the head driver 13a (see FIG. 1) and supplies drive voltages to the odd-numbered ejection holes P1 and P3. Similarly, the even-side head driver 13a2 is part of the head driver 13a and supplies drive voltages to the even-numbered ejection holes P2 and P4.

Using the print head 109 according to the second embodiment, the printer 101 sets process pixels to be used in the error diffusion process and applies a corresponding weighted matrix to the layout of process pixels, as in the first embodiment described above. Accordingly, the printer 101 according to the second embodiment can avoid cases in which a load is applied to all ejection holes belonging to any one supply system configured of electrical paths for supplying drive voltages to the ejection holes when forming dots (ejecting ink) in each column.

The control process performed in the second embodiment to avoid situations in which a load is applied to all ejection holes belonging to any single supply system can be performed similar to that described in the first embodiment, by modifying the layout settings of process pixels corresponding to each raster and modifying the order for applying weighted matrices to accompany the change in layout settings for process pixels.

As shown in FIG. 8A, the process pixel setting data for f1 values of 0-15 is either A, indicating that process pixels are in odd-numbered columns, or B, indicating that process pixels are in even-numbered columns.

More specifically, the process pixel setting data A is associated with rasters having an f1 value of 0, while the process pixel setting data B is associated with rasters having an f1 value of 1. Thereafter, the process pixel setting data alternates between A and B as f1 is incremented by 1 until the f1 value reaches 7.

Further, the setting data B is associated with rasters having an f1 value of 8, while the setting value A is associated with rasters having an f1 value of 9. Thereafter, the process pixel setting data alternates between B and A as f1 is incremented by 1 until the f1 value reaches 15. When applying the image process according to the first embodiment described above (see FIG. 2) to the process pixel setting data shown in FIG. 8A, S3 in FIG. 2 should read "f1=n % 16."

As a result, the CPU 2 staggers the process pixels in the sub-scanning direction (from row-to-row) for the eight rasters indicating f1 values from 0 to 7 in relation to the eight rasters indicating f1 values from 8 to 15.

Stated another way, by setting process pixel setting data based on the f1 value and the table shown in FIG. 8A, the order of rasters in which pixels in odd-numbered columns are set as the process pixels and rasters in which pixels in even-numbered columns are set as the process pixels is reversed every eight rasters, which is equivalent to the pitch of the first and third ejection holes P1 and P3 connected to the odd-side head driver 13a1 or the pitch of the second and fourth ejection holes P2 and P4 connected to the even-side head driver 13a2.

As shown in FIG. 8A, the matrix data F1, R1, F2, R2, F2, R2, F2, and R2 are respectively associated with f2 values from 0 through 7 in the second embodiment. When applying the image process of the first embodiment described above (see FIG. 2) to the matrix setting data shown in FIG. 8(b), S5 in FIG. 2 should read "f2=n % 8."

FIG. 9 conceptually illustrates the pixels in a 16×16 pixel region for which dots can be formed as a result of setting process pixels and setting a weighted matrix for the error diffusion process according to the second embodiment. In FIG. 9, numbers have been added to the shaded boxes (dot positions) to specify the pass in which the dots are formed.

As shown in FIG. 9, the pattern of odd and even pixels at which dots can be formed is reversed in cycles of eight rasters, which is equivalent to the pitch of the first and third ejection holes P1 and P3 connected to the odd-side head driver 13a1 or the pitch of the second and fourth ejection holes P2 and P4 connected to the even-side head driver 13a2. Hence, ejection holes in a column extending in the sub-scanning direction of the print head 109 and connected to the same head driver (13a1 or 13a2) are set so as to alternate along the sub-scanning direction between ejection holes for forming dots in odd-numbered columns and ejection holes for forming dots in even-numbered columns.

As described above, the printer 101 (the control circuit board 12) according to the second embodiment avoids cases in which a load is applied to all ejection holes connected to the same drive voltage supply path (the first and third ejection holes P1 and P3, for example) when forming dots in each column. The printer 101 achieves this by setting process pixels for use in the error diffusion process on each raster of the input image data based on the pitch of ejection holes formed in the print head 109 and the connection relationship between the ejection holes and the electrical paths (supply paths; i.e., the state of electrical connection) and by applying a weighted matrix having weights arranged according to the layout of the process pixels.

Accordingly, the printer 101 can satisfactorily maintain the ejection holes in a stable state during dot formation, even when shortening the drive interval for ejection holes arranged in a dense configuration, i.e., the period between ink ejections from the same ejection hole (ejection cycle). Thus, the printer 101 can satisfactorily prevent the formation of nonuniform or improper dot shapes, enabling higher quality images to be recorded at a high speed.

While the invention has been described in detail with reference to specific embodiments thereof, it would be apparent to those skilled in the art that many modifications and variations may be made therein without departing from the spirit of the invention, the scope of which is defined by the attached claims.

For example, in the second embodiment described above, the printer 101 avoids cases in which a load is applied to all ejection holes P1-P4 aligned in the sub-scanning direction of the print head 109 when forming dots in each column, while also giving consideration to the electrical paths for supplying drive voltages to the ejection holes (the drive voltage supply system). However, the printer 101 may also avoid cases in which a load is applied to all ejection holes P1-P4 with consideration for the channels for supplying ink to the ejection holes.

In this case, the printer 101 sets process pixels for use in the error diffusion process on each raster of the input image data based on the pitch of ejection holes formed in the print head 109 and the connection relationship between the ejection holes and the ink channels (i.e., the state of fluid communication) and by applying a weighted matrix having weights arranged according to the layout of the process pixels.

Replacing electrical paths for supplying drive voltages to the ejection holes P1-P4 shown in FIG. 7 with ink channels that supply ink to the ejection holes P1-P4 can obtain the same effects as described in the second embodiment. Hence, by setting process pixels for the error diffusion process and a weighted matrix with weights based on the layout of the process pixels, the printer 101 can avoid cases in which a load is applied to all ejection holes that are connected to the identical ink channel and adjacent to each other (a same ink source; the first and third ejection holes P1 and P3, for example), that is, can avoid driving all of these ejection holes.

Similarly, the printer 101 can avoid applying a load to all ejection holes connected to adjacent ink channels (the first and second ejection holes P1 and P2, for example) during dot formation.

Avoiding the condition of applying a load to ejection holes connected to neighboring ink channels during dot formation can prevent the behavior of these ejection holes from interfering with each other in the formation of dots (i.e., the occurrence of cross-talk).

As a result, the printer 101 can satisfactorily maintain the ejection holes in a stable state during dot formation, even when shortening the drive interval of the ejection holes (ejection cycle). Accordingly, the printer 101 can prevent the formation of nonuniform or improper dots, enabling higher quality images to be recorded at a high speed.

The printer 1 and 101 may also set pixels constituting a blue noise mask with blue noise characteristics as the process pixels for error diffusion. By setting the pixels of a blue noise mask as the process pixels, the printer 1 and 101 can also reduce graininess in an image recorded on paper while avoiding a condition in which load is applied to all ejection holes during dot formation in each column (i.e., a state in which the printer 1 and 101 drives all actuating elements to eject ink from all ejection holes).

In the preferred embodiments described above, binary error diffusion is used as an example of the error diffusion process executed in S7 of the image process (see FIG. 2), but multilevel error diffusion may be used instead. Multilevel error diffusion not only can determine whether to form dots, but also can change the size of the dots.

In the preferred embodiments described above, the image process shown in FIG. 2 is implemented in software, but this process may be implemented in hardware instead. In particular, setting the layout of process pixels used in error diffusion in a cyclic pattern can easily be implemented in hardware.

In the preferred embodiments described above, half (50%) of all ejection holes arranged linearly in the sub-scanning direction of the print head 109 can be used for forming dots in each main scan. However, the ratio of ejection holes that can be used to form dots in each column to the ejection holes that cannot be used is not limited to 50:50. For example, the number of ejection holes that can be used and cannot be used may differ by 1 or 2, for example.

Cases in which a load is applied to all ejection holes arranged linearly in the sub-scanning direction of the print head 109 when forming dots in a single column can be reliably avoided by using only a portion of all ejection holes arranged in the sub-scanning direction, such as a ratio of 40:60 for ejection holes that can be used in dot formation for each column to ejection holes that cannot be used.

Similarly, in the second embodiment described above, the number of ejection holes that can be used in each main scan is set to 50% of the total ejection holes included in each group of ejection holes belonging to each system for supplying drive voltages to the ejection holes (25% of all ejection holes). However, the ratio of ejection holes that can be used for dot formation in each column to ejection holes that cannot be used is not limited to 50% for each group, but the number that can be used and cannot be used may differ by 1 or 2, for example. The ratio may also be set to 40:60 or the like.

The preferred embodiments described above give examples of dot arrangements when the printing resolution is four times the print head resolution. However, the relationship between the printing resolution and the print head resolution is not limited to a multiple of four, but may be another multiple, provided that the multiple is an integer.

In the preferred embodiments described above, dots are arranged in the regions shown in FIGS. 5, 6, and 9 configured of $1^{st}$ through $16^{th}$ columns and $1^{st}$ through $16^{th}$ rows, but the numbers of columns and rows is not particularly limited.

In the second embodiment described above, the number of supply systems (denoted by $N_c$) for supplying drive voltages to ejection holes in the print head 109 is set to 2, but this variable may take on a variety of values based on the configuration of the printer 101. For example, if the ejection holes aligned in the sub-scanning direction of the print head 109 are arranged in n sets of staggered columns, such as 2n columns, $N_c=2n$ when dividing the supply systems into n for each column. The value of $N_c$ may also be odd. In the first embodiment described above $N_c=1$.

In the preferred embodiments described above, the control circuit board 12 is used as an example of an image processor in the present invention. However, the image processor that implements the processes shown in the flowchart of FIG. 2 may be provided in a device separate from the printer 1 and 101, such as a personal computer or a printer server.

Further, while the present invention is applied to an inkjet printer in the preferred embodiments, the present invention may similarly be applied to a multifunction peripheral, facsimile machine, or other device.

Further, the recording medium used in the preferred embodiments is formed of paper, but may be formed of a material other than paper, such as cloth or vinyl.

What is claimed is:

1. An inkjet printer comprising:
   a recording head having a plurality of recording elements arranged at a prescribed pitch in a first direction, the recording head being movable in a second direction perpendicular to the first direction, the recording head being capable of forming dots on a recording medium a distance shorter than the prescribed pitch between two adjacent recording elements of the recording head;
   a conveying unit configured to convey the recording medium in the first direction past the recording head;
   a scanning unit configured to move the recording head back and forth in the second direction;
   a setting unit configured to set process pixels in an input image by rendering at least one of the plurality of recording elements disabled so as not to form dots and at least another one of the plurality of recording elements enabled to allow dots to be formed in each of a plurality of columns of the recording medium, the process pixel having density data representing a gradation level of the process pixel, row positions of the process pixels being determined depending upon the prescribed pitch between two adjacent recording elements of the recording head, wherein the setting unit sets the process pixels in the input image by applying one process pixel pattern to one plurality of pixel rows adjacent to each other that includes one pixel row of the input image corresponding to one recording element in the recording elements, and applying another process pixel pattern to another plurality of pixel rows adjacent to each other that includes another pixel row of the input image corresponding to another recording element in the recording elements in a single scan of the recording head in the second direction, the one process pixel pattern being different from the another process pixel pattern; and
   a dot data generating unit configured to generate dot data by applying a weight matrix to the density data of the process pixel, weights set in the weight matrix being allocated based on an arrangement of the process pixels depending on the one process pixel pattern or the another process pixel pattern, the dot data being applied to the recording head to form dots on the recording medium.

2. The inkjet printer according to claim 1, wherein the recording head is connected to a plurality of ink channels that supply fluid for forming dot to the plurality of recording elements, and
   wherein the setting unit is configured to set the process pixels in the input image by applying one process pixel pattern to one pixel row of the input image corresponding to one recording element in the recording elements and applying another process pixel pattern to another pixel row of the input image corresponding to another recording element in the recording elements in a single scan of the recording head in the second direction, the one recording element and the another recording element being supplied with the fluid from an identical ink channel in the ink channels and being adjacent to each other.

3. The inkjet printer according to claim 1, wherein the recording head is connected to a plurality of power sources that supply drive voltages to the plurality of recording elements, and
   wherein the setting unit sets the process pixels in the input image by applying one process pixel pattern to one pixel row of the input image corresponding to one recording element in the recording elements and applying another process pixel pattern to another pixel row of the input image corresponding to another recording element in the recording elements in a single scan of the recording head in the second direction, the one recording element and the another recording element being supplied with the drive voltages from an identical power source in the power sources.

4. The inkjet printer according to claim 1, wherein the setting unit sets the process pixels in the input image by applying the one process pixel pattern to half of the pixel rows of the input image corresponding to half of the plurality of ejection elements and applying the another process pixel pattern to the pixel rows of the input image corresponding to remaining half of the plurality of ejection elements in the single scan of the recording head in the second direction, the one process pixel pattern indicating that process pixels are in odd-numbered columns of each pixel row, the another process pixel pattern indicating that process pixels are in even-numbered columns of each pixel row.

5. The inkjet printer according to claim 4, wherein the half of the pixel rows are alternating pixel rows in the pixel rows of the input image corresponding to the plurality of ejection elements, and the remaining half of the pixel rows are different alternating pixel rows than the half of the pixel rows.

6. The inkjet printer according to claim 1, wherein the setting unit sets pixels each constituting a blue noise mask with blue noise characteristics as the process pixels for error diffusion.

7. A method for controlling an inkjet printer comprising a recording head having a plurality of recording elements arranged at a prescribed pitch in a first direction, the recording head being movable in a second direction perpendicular to the first direction, the recording head being capable of forming dots on a recording medium a distance shorter than the prescribed pitch between two adjacent recording elements of the recording head, wherein the setting unit sets the process pixels in the input image by applying one process pixel pattern to one plurality of pixel rows adjacent to each other that includes one pixel row of the input image corresponding to one recording element in the recording elements, and applying another process pixel pattern to another plurality of pixel rows adjacent to each other that includes another pixel row of the input image corresponding to another recording element in the recording elements in a single scan of the recording head in the second direction, the one process pixel pattern being different from the another process pixel pattern; a conveying unit configured to convey the recording medium in the first direction past the recording head; and a scanning unit configured to move the recording head back and forth in the second direction, the method comprising:
   setting process pixels in an input image by rendering at least one of the plurality of recording elements disabled so as not to form dots and at least another one of the plurality of recording elements enabled to allow dots to be formed in each of a plurality of columns of the recording medium, the process pixel having density data representing a gradation level of the process pixel, row positions of the process pixels being determined depending upon the prescribed pitch between two adjacent recording elements of the recording head; and
   generating dot data by applying a weight matrix to the density data of the process pixel, weights set in the weight matrix being allocated based on an arrangement of the process pixels depending on the one process pixel pattern or the another process pixel pattern, the dot data being applied to the recording head to form dots on the recording medium.

8. A computer-readable storage medium storing a set of program instructions executable on an inkjet printer comprising a recording head having a plurality of recording elements arranged at a prescribed pitch in a first direction, the recording head being movable in a second direction perpendicular to the first direction, the recording head being capable of forming dots on a recording medium a distance shorter than the prescribed pitch between two adjacent recording elements of the recording head, wherein the setting unit sets the process pixels in the input image by applying one process pixel pattern to one plurality of pixel rows adjacent to each other that includes one pixel row of the input image corresponding to one recording element in the recording elements, and applying another process pixel pattern to another plurality of pixel rows adjacent to each other that includes another pixel row of the input image corresponding to another recording element in the recording elements in a single scan of the recording head in the second direction, the one process pixel pattern being different from the another process pixel pattern; a conveying unit configured to convey the recording medium in the first direction past the recording head; and a scanning unit configured to move the recording head back and forth in the second direction, the set of program instructions comprising:

setting process pixels in an input image by rendering at least one of the plurality of recording elements disabled so as not to form dots and at least another one of the plurality of recording elements enabled to allow dots to be formed in each of a plurality of columns of the recording medium, the process pixel having density data representing a gradation level of the process pixel, row positions of the process pixels being determined depending upon the prescribed pitch between two adjacent recording elements of the recording head; and generating dot data by applying a weight matrix to the density data of the process pixel, weights set in the weight matrix being allocated based on an arrangement of the process pixels depending on the one process pixel pattern or the another process pixel pattern, the dot data being applied to the recording head to form dots on the recording medium.

* * * * *